United States Patent [19]

Wolters

[11] Patent Number: 4,552,273

[45] Date of Patent: Nov. 12, 1985

[54] PAPER MANAGEMENT SUPPORT RACK

[75] Inventor: Richard H. Wolters, Grand Rapids, Mich.

[73] Assignee: Westinghouse Electric Corp., Pittsburgh, Pa.

[21] Appl. No.: 582,210

[22] Filed: Feb. 21, 1984

[51] Int. Cl.⁴ ............................................. A47B 57/04
[52] U.S. Cl. .................................... 211/187; 312/245; 312/350
[58] Field of Search ................. 312/350, 245, 257 SK; 108/60, 61; 403/407, 408; 211/186, 187; 248/235, 200, 300, 247, 243

[56] References Cited

U.S. PATENT DOCUMENTS

| | | | |
|---|---|---|---|
| 3,036,673 | 5/1962 | Santerre | 403/407 |
| 3,371,976 | 3/1968 | Ritz, Jr. | 312/245 |
| 3,443,851 | 5/1969 | Earl | 312/245 |
| 3,554,142 | 1/1971 | Sorenson | 248/235 |
| 4,043,625 | 2/1976 | Blecker | 312/351 |
| 4,076,353 | 2/1978 | Barlow | 312/350 |
| 4,155,607 | 5/1979 | Sitler | 312/184 |
| 4,193,650 | 3/1980 | Gray | 312/205 |

FOREIGN PATENT DOCUMENTS

| | | | |
|---|---|---|---|
| 210820 | 2/1972 | Fed. Rep. of Germany | 312/245 |
| 7903705 | 11/1980 | Netherlands | 108/109 |

Primary Examiner—William E. Lyddane
Assistant Examiner—Joseph Falk
Attorney, Agent, or Firm—B. R. Studebaker

[57] ABSTRACT

A paper management support rack for supporting a plurality of shelves, trays and the like within a larger storage cavity which includes an upper shelf having internally directed flanges on the underside thereof. The support rack includes a planar guide panel supported between a pair of hanger bars which have wedge clips at their upper end which rigidly lock the support rack to the upper shelf of the cavity between the shelf underside and the internally directed flanges.

8 Claims, 7 Drawing Figures

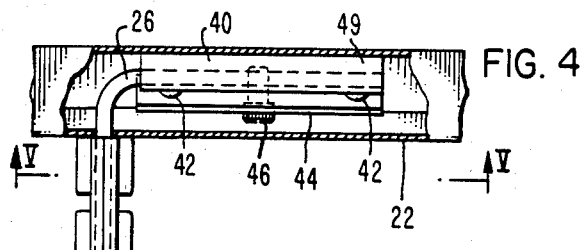
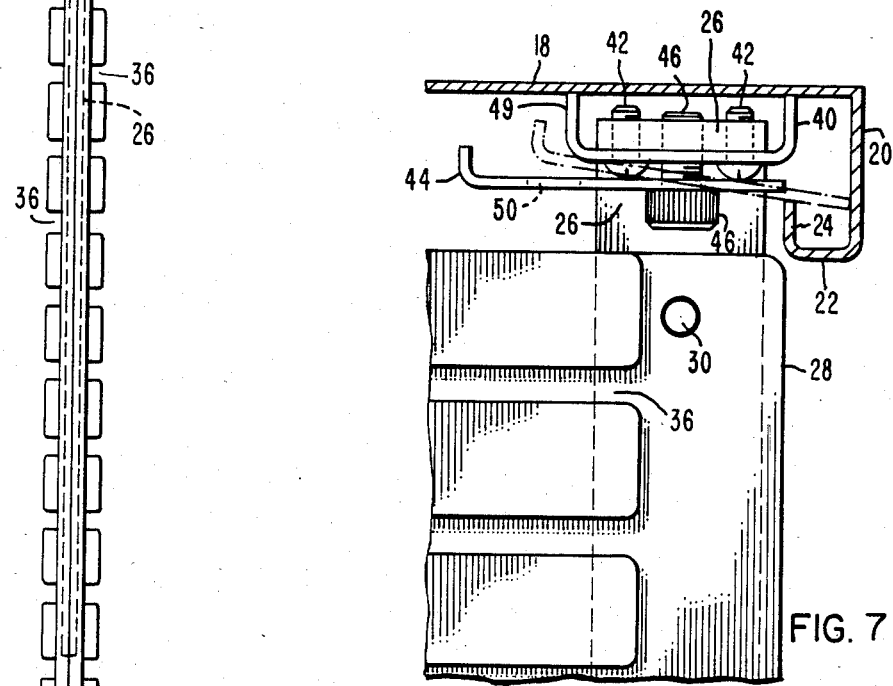
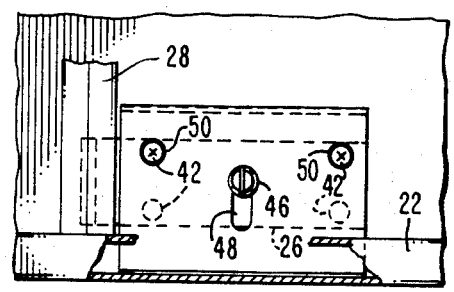
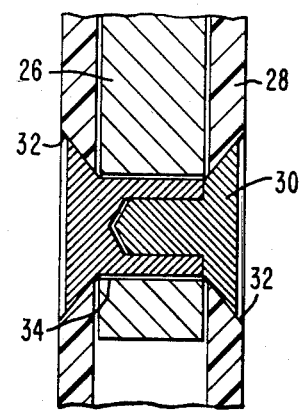
FIG. 4
FIG. 7
FIG. 5
FIG. 6

4,552,273

PAPER MANAGEMENT SUPPORT RACK

BACKGROUND OF THE INVENTION

This invention relates to a support rack for compartmentalizing and subdividing shelf space and more particularly to a support rack which is rigidly suspended from the underside of an upper shelf and readily adapted to accommodate shelves, trays or the like of varying widths, particularly in the office environment.

Most office storage cabinets and shelving have a shelf height of at least 12 inches and with the exception of stacking magazines or storing large, bulky items, at least half of the space between the shelves is generally vacant and constitutes a very inefficient use of the storage space. The ability to selectively compartmentalize this space to accommodate a specific storage problem is obviously desirable and will enhance the ability to efficiently utilize the entire space between the pair of spaced cabinet shelves.

Many different systems have been employed to subdivide the interior of the space between shelves in the office environment for purposes of paper management. One such system is disclosed in U.S. Pat. No. 4,043,625 to R. A. Bleeker for Cam Secured Support Panel. In this system the support panels or racks were loosely hung from internally directed troughs of the upper shelf and a cam member was located in the bottom of the support panel in an attempt to provide rigidity to the support structure. Of course, this system was only operable where the distance between shelves was substantially identical with the panel height. Other systems have employed dividing racks which merely sat on the bottom shelf and extended upwardly into the cavity, or involved racks hung from the top shelf which required a spacer bar spanning the distance between the panels to prevent the panels from swinging away from each other and the shelves, trays or the like falling from between their support slots. Employing such spanning rigidizers limits the variations of spacing between depending support racks to the length of the spanner or rigidizing bar.

The need for an inner cabinet compartmentalizing storage system which provides versatility of spacing between support racks in order to accommodate varying sizes of paper and materials, as for example, legal size, letter size and computer read-out size paper is readily apparent.

SUMMARY OF THE INVENTION

The paper management support racks of the present invention provide a rigidly mounted planar panel having a plurality of horizontal shelf supporting slots on each lateral surface and has the ability to be spaced from an adjacent support rack at any distance chosen by the user.

The foregoing is accomplished in accordance with the present invention by providing a support rack for supporting a plurality of trays, shelves or the like within a larger storage cavity in part defined by an upper shelf having internal flanges on the underside thereof. The support rack includes a pair of spaced L-shaped hanger bars interconnected by a planar guide rack secured to one of the legs of each of the hanger bars and spanning the space therebetween. Slidable wedging means are secured to the other leg of each of the hanger bars which are slidably movable to rigidly mount the support rack between the underside of the upper shelf and the internal flanges on that shelf. The planar guide rack includes a plurality of horizontal slots on each side thereof for slidably receiving the trays, shelves or the like between a pair of spaced support racks. The wedging means includes a U-shaped bracket secured to the hanger bar by a plurality of bolts and a locking plate slidably movable on the U-shaped bracket from a first unlocked position to a second, locked position to rigidly mount said support rack between the underside of said upper shelf and the internal flanges on the underside of the upper shelf. The plurality of bolts securing the hanger bar to the U-shaped brackets have rounded heads and the locking plate is releasably secured to the U-shaped bracket for movement relative thereto by another bolt extending through an elongated slot in the locking plate. The locking plate further includes apertures therethrough for receiving the rounded heads of selected of the plurality of bolts connecting the hanger bar to the U-shaped bracket when the other bolt secures the locking plate in its locked position.

BRIEF DESCRIPTION OF THE DRAWING

Many of the attendant advantages of the present invention will become more readily apparent and better understood as the following detailed description is considered in connection with the accompanying drawing in which:

FIG. 4 is a sectional view taken along the line IV—IV of FIG. 2;

FIG. 5 is a sectional view taken along the line V—V of FIG. 4;

FIG. 6 is a sectional view taken along the line VI—VI of FIG. 2; and

FIG. 7 is an enlarged view of the upper righthand corner of FIG. 2 illustrating the mounting operation.

DESCRIPTION OF THE PREFERRED EMBODIMENT

Figure 1:
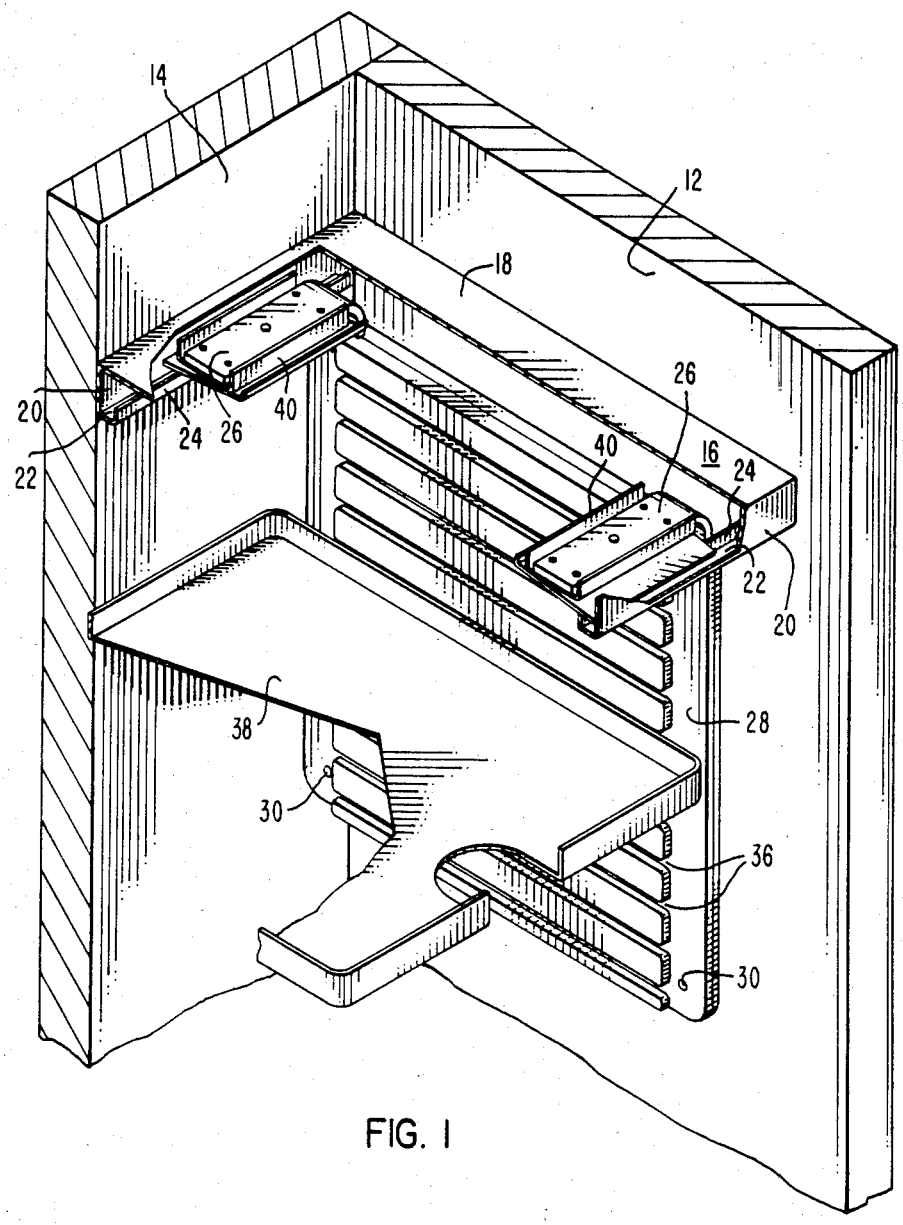
FIG. 1 is a perspective view illustrating the support rack of this invention mounted to the underside of an upper shelf.
Figure 3:
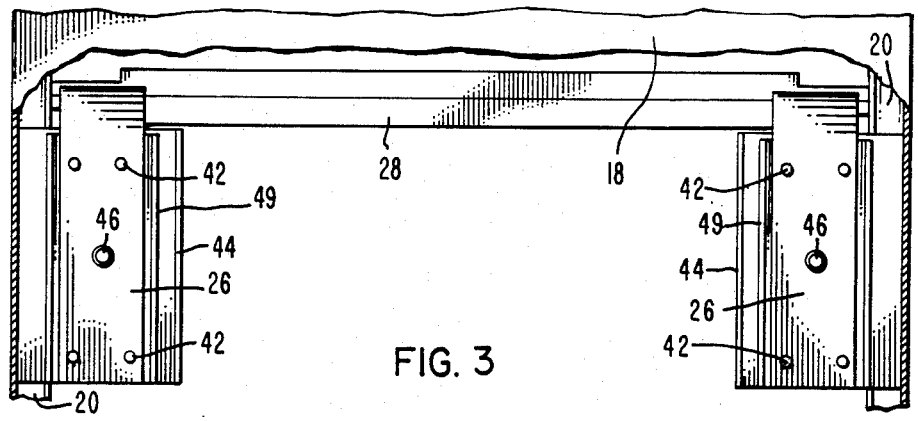
FIG. 3 is a top plan view of the support rack of this invention with the upper shelf broken away.

Referring now in detail to the drawing wherein like reference characters represent like parts throughout the several views, there is illustrated in FIG. 1 a portion of a typical storage cabinet or shelf arrangement of the type employed in offices generally. The cabinet includes an end wall 12 and a rear wall 14 having a shelf 16 mounted thereto. A typical steel shelf 16 includes a large planar shelf surface 18, front and rear edges 20 which typically include an inwardly directed flange 22 that curls upwardly in a second flange 24 to form a trough-like configuration and add rigidity to the shelf.

The foregoing describes a typical storage cabinet or the like as used in many offices and creates a plurality of large storage cavities which the support rack of the present invention is employed to subdivide in order to make more efficient use of the space. The support rack of the present invention includes a pair of spaced, inverted L-shaped hanger bars 26 which are preferably zinc-plated heavy gauge carbon steel to impart rigidity to the support rack. The hanger bars are interconnected by a planar plastic guide rack panel 28 which is of sandwich construction and preferably styrene and which has its two halves secured to the hanger bar 26 by flat head compression rivets 30 adjacent each corner. As best seen in FIG. 6, the flat head compression rivets 30 are seated in the countersinks 32 in the guide rack panel 28 and extend through apertures 34 in the hanger bar 26. The guide rack panel 28 is provided with a plurality of tray or shelf-receiving horizontal slots in each lateral molded surface thereof for receiving paper trays or the like 38 which may be horizontally separated as the user desires.

At the upper end, each of the L-shaped hanger bars 26 has secured thereto a U-shaped locking plate bracket 40 by means of four spaced round head bolts 42. A locking plate 44 is releasably secured to the U-shaped bracket 40 by a larger bolt 46 which extends through an elongated slot 48 in the locking plate 44. The larger bolt 46 may have a knurled lateral surface to facilitate hand tightening of the bolt 46. The locking plate 44 also has a pair of spaced apertures 50 therethrough which coincide with and are constructed to overlie the heads of the two round head bolts 42 on the innermmost side of the U-shaped brackets 40.

Figure 2:
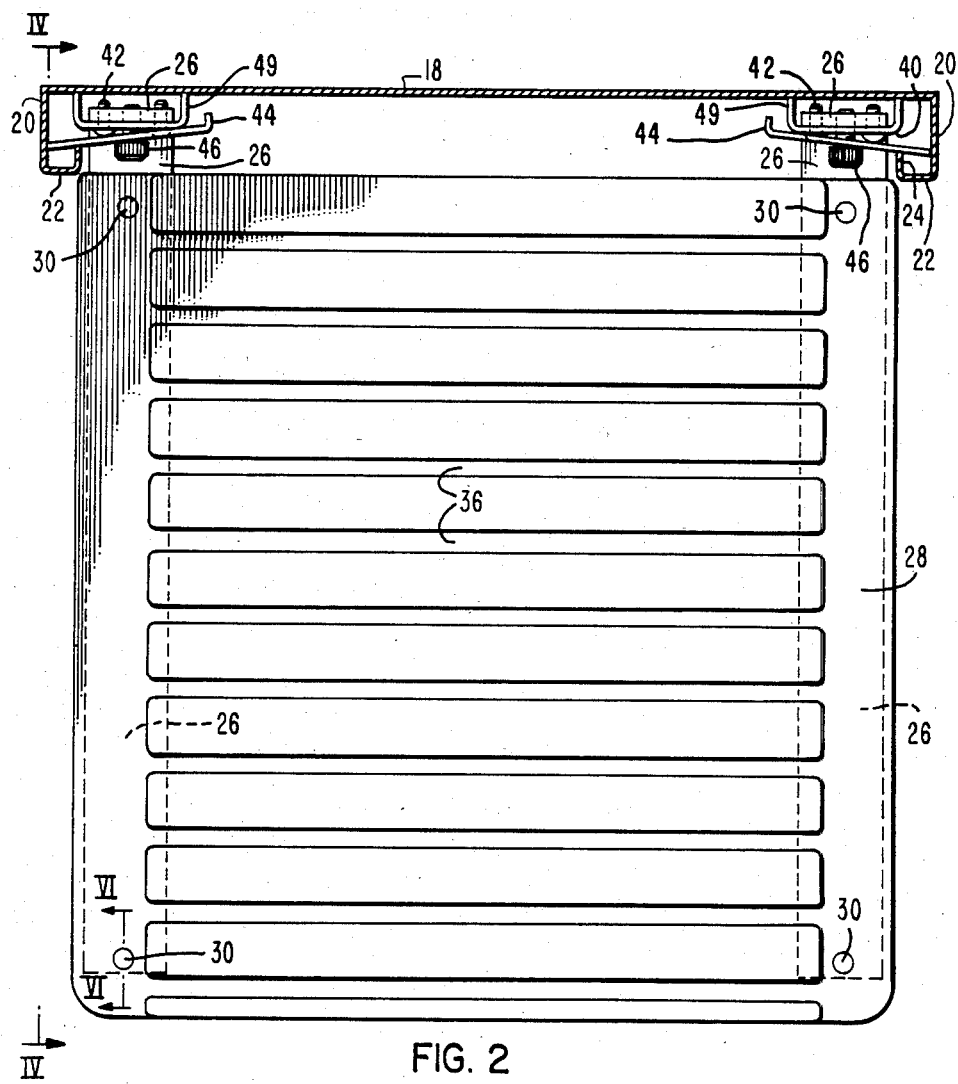
FIG. 2 is a side elevation view with the upper shelf in section.

In mounting the support rack of this invention to the underside of a shelf, the legs 49 of the pair of U-shaped locking plate brackets 40 are placed against the underside of the shelf in firm contact therewith and the locking bar is moved laterally outwardly toward the front and rear edges 20 of the shelf until the apertures 50 in the locking plate 44 overlie the rounded heads of the bolts or screws 42. The locking screw 46 is then tightened, causing the locking plate 44 to tilt as the heads of the innermost bolts or screws 42 enter the apertures 50 in the locking plate 44. As can be clearly seen in FIG. 2, the outwardly extending edge of the locking plate 44 is angled away from the U-shaped locking plate bracket and securely, in a wedge-like fashion, secures the support rack of this invention firmly to the underside of the shelf 18.

As will be apparent, the paper management support rack of this invention is intended to be used in groups of two or more spaced apart at preselected distances in order that the larger cavity between shelves can be subdivided into smaller paper or material supporting compartments by sliding into the slots 36 of adjacent support racks either paper trays of the type illustrated at 38, simple flat plastic separators or similar support means. The support racks are easily movable as storage requirements change in that merely loosening the bolts 46 will permit the wedge or locking plate 44 to be moved to a position beyond the confines of the trough defined by the flanges 22, 24, the support rack moved to a new position, the locking plate returned to its locked position and the bolts 46 retightened.

What is claimed is:

1. A support rack for supporting a plurality of trays, shelves or the like within a larger storage cavity including an upper shelf having internal flanges on opposite sides of the underside thereof, said support rack comprising:
    a pair of spaced L-spaced hanger bars;
    a planar guide rack secured to one of the legs of each of said hanger bars and spanning the space therebetween; and
    slidable wedging means secured to the other leg of each of said hanger bars, each said slidable wedging means movable with respect to said other leg and engaging said internal flanges to rigidly mount said support rack between the underside of said upper shelf and said internal flanges on said upper shelf.

2. The support rack of claim 1 wherein said planar guide rack includes a plurality of horizontal slots on each side thereof.

3. The support rack of claim 1 wherein said wedging means includes a U-shaped bracket, constructed and arranged to contact the underside of said shelf, secured to said hanger bars by a plurality of bolts and a locking plate secured to and slidably movable on said U-shaped bracket from a first, unlocked position to a second, locked position in contact with said internal flanges to rigidly mount said support rack to the underside of said upper shelf.

4. The support rack according to claim 3 wherein said plurality of bolts have rounded heads and said locking plate is releasably secured to said U-shaped bracket for movement relative thereto another bolt extending through an elongated slot in said locking plate, said locking plate further including apertures therethrough for receiving the rounded heads of selected of said plurality of bolts when said another bolt secures said locking plate in its locked position.

5. A support rack for supporting a plurality of shelves, trays or the like within a larger storage cavity including an upper shelf having internal flanges on opposite sides of the underside thereof, said support rack comprising:
    a pair of spaced inverted L-shaped bar members;
    a planar support panel secured to each of the longer downwardly extending leg portions of said bar members and spanning the space therebetween;
    a U-shaped bracket secured to the shorter leg of each of said bar members constructed and arranged to abut the underside of said shelf; and
    a slidable locking plate secured to each of said U-shaped brackets and slidable thereon from a first unlocked position to a locked position in contact with said internal flanges on the underside of said shelf.

6. The support rack according to claim 5 wherein said planar support panel includes a plurality of vertically spaced horizontal slots therein on each side thereof for receiving shelves, trays or the like.

7. The support rack according to claim 5 wherein said U-shaped bracket is secured to said L-shaped bar members by a plurality of bolts and said locking plate is secured to said U-shaped bracket by another bolt extending through an elongated slot in said locking plate.

8. The support rack according to claim 7 wherein said locking plate further includes apertures therethrough for receiving the heads of selected of said plurality of bolts when said another bolt secures said locking plate in its locked position.

* * * * *